(12) United States Patent  (10) Patent No.: US 10,282,345 B2
Chen et al.  (45) Date of Patent: May 7, 2019

(54) COMBO CHIP FOR USB CONNECTOR

(71) Applicant: REALTEK SEMICONDUCTOR CORP., Hsinchu (TW)

(72) Inventors: Chien-Wen Chen, Toufen Township, Miaoli County (TW); Ming-Hui Tung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 127 days.

(21) Appl. No.: 15/080,279

(22) Filed: Mar. 24, 2016

(65) Prior Publication Data

US 2016/0306771 A1  Oct. 20, 2016

Related U.S. Application Data

(60) Provisional application No. 62/149,980, filed on Apr. 20, 2015.

(51) Int. Cl.
*G06F 13/42* (2006.01)
*G06F 13/38* (2006.01)
*G06F 13/40* (2006.01)

(52) U.S. Cl.
CPC ........ *G06F 13/4286* (2013.01); *G06F 13/385* (2013.01); *G06F 13/4022* (2013.01)

(58) Field of Classification Search
CPC .......... G06F 13/38; G06F 13/40; G06F 13/42; G06F 13/385
See application file for complete search history.

(56) References Cited

U.S. PATENT DOCUMENTS

| 8,064,613 | B1* | 11/2011 | Helfrich | H04R 5/04 |
| | | | | 381/113 |
| 8,706,944 | B2* | 4/2014 | Song | G06F 13/387 |
| | | | | 710/313 |
| 2010/0070748 | A1* | 3/2010 | Duan | H04L 12/40006 |
| | | | | 713/2 |
| 2011/0191503 | A1* | 8/2011 | Kakish | G06F 13/10 |
| | | | | 710/15 |
| 2012/0131243 | A1* | 5/2012 | Ji | G06F 1/22 |
| | | | | 710/63 |

(Continued)

FOREIGN PATENT DOCUMENTS

| CN | 101231624 A | 7/2008 |
| CN | 204179435 U | 2/2015 |

*Primary Examiner* — Steven G Snyder
*Assistant Examiner* — Christopher A Daley
(74) *Attorney, Agent, or Firm* — Muncy, Geissler, Olds & Lowe, P.C.

(57) ABSTRACT

A combo chip is provided. The combo chip is applicable to an USB connector, and includes an USB type-C circuit, an USB non-type-C circuit, a switch unit, and a mode control unit. The switch unit is connected to the USB type-C circuit and the USB non-type-C circuit, and the mode control unit is connected to a control terminal of the switch unit. After performing one or more mode determination procedures, the mode control unit controls the switch unit to connect the USB type-C circuit to a first pin and a second pin while disconnecting the USB non-type-C circuit from the first pin and the second pin, or otherwise controls the switch unit to connect the USB non-type-C circuit to the first pin and the second pin while disconnecting the USB type-C circuit from the first pin and the second pin.

5 Claims, 4 Drawing Sheets

(56) References Cited

U.S. PATENT DOCUMENTS

| | | | |
|---|---|---|---|
| 2013/0159559 A1* | 6/2013 | Hess | G06F 13/385 710/14 |
| 2015/0331826 A1* | 11/2015 | Ghosh | G06F 13/4022 710/313 |
| 2016/0127671 A1* | 5/2016 | Hundal | G06F 13/4247 348/723 |
| 2016/0179648 A1* | 6/2016 | Srivastava | G06F 11/3051 710/16 |
| 2016/0188506 A1* | 6/2016 | Wang | G06F 13/287 710/106 |
| 2016/0253283 A1* | 9/2016 | Bowers | G06F 13/4068 710/305 |
| 2016/0259005 A1* | 9/2016 | Menon | G01R 31/3177 |

* cited by examiner

COMBO CHIP FOR USB CONNECTOR

CROSS-REFERENCE TO RELATED APPLICATION

This application claims priority to U.S. Provisional Application No. 62/149,980, filed on Apr. 20, 2015, in the United States Patent and Trademark Office, the disclosure of which is incorporated herein in its entirety by reference.

BACKGROUND OF THE INVENTION

1. Field of the Invention

The present disclosure relates in general to a combo chip which is applicable to a universal serial bus (USB) connector, and more particularly to a combo chip applicable to an USB connector which is capable of sharing chip pins under different operating modes.

2. Description of the Related Art

The current trend of transmission interface design for electronic devices is to integrate all the functions into one transmission interface. Among various transmission interfaces, the USB is the most popular transmission interface. Currently, the mechanical standard of USB has reached the so-called type-C, which has 24 pins for supporting diverse operating modes.

Generally, the chip pins of the conventional USB connector are tailored to meet different operating modes of the USB. As mentioned above, USB can operate in many modes. If each set of the chip pins uniquely corresponds to each operating mode of the USB, excessive amount of chip pins will be required and increment in packaging size and cost will be inevitable. Furthermore, long bonding wiring to the chip pins will cause the performance of the chip under high frequency to drop.

SUMMARY OF THE INVENTION

In view of the aforementioned technical problems, the primary objective of the present disclosure is to provide a combo chip which is applicable to an USB connector so as to resolve the problem of different circuit function requiring different chip pins.

In accordance with one objective of the present disclosure, a combo chip is provided. The combo chip is applicable to an USB connector, and may include an USB type-C circuit, an USB non-type-C circuit, a switch unit connected to the USB type-C circuit and the USB non-type-C circuit, and a mode control unit connected to a control terminal of the switch unit. After performing one or more mode determination procedures, the mode control unit may control the switch unit to connect the USB type-C circuit to a first pin and a second pin and may disconnect the USB non-type-C circuit from the first pin and the second pin, or may control the switch unit to connect the USB non-type-C circuit to the first pin and the second pin and may disconnect the USB type-C circuit from the first pin and the second pin.

Preferably, the mode control unit may be connected to the USB type-C circuit, and the one or more mode determination procedures may include an alternative (ALT) mode determination procedure. If the ALT mode determination procedure returns a true result, the mode control unit may control the first pin and the second pin to connect to the USB type-C circuit and may configure the USB type-C circuit to a general purpose input/output (GPIO) mode. Otherwise, the mode control unit may control the first pin and the second pin to connect to the USB non-type-C circuit if the ALT mode determination procedure returns a false result.

Preferably, after the ALT mode determination procedure returns a true result and the mode control unit controls the first pin and the second pin to connect to the USB type-C circuit, the mode control unit may perform a GPIO mode determination procedure. If the GPIO mode determination procedure returns a true result, the mode control unit may configure the USB type-C circuit to the GPIO mode. Otherwise, the mode control unit may configure the USB type-C circuit to a debug port mode if the GPIO mode determination procedure returns a false result.

Preferably, after the GPIO mode determination procedure returns a false result and before the mode control unit configures the USB type-C circuit to the debug port mode, the mode control unit may perform a debug mode determination procedure. If the debug mode determination procedure returns a true result, the mode control unit may configure the USB type-C circuit to the debug port mode. Otherwise, the mode control unit may configure the USB type-C circuit to a RS232 interface mode if the debug mode determination procedure returns false a result.

Preferably, after the debug mode determination procedure returns a false result and before the mode control unit configures the USB type-C circuit as the RS232interface mode, the mode control unit may perform a RS232 interface mode determination procedure. If the RS232 mode determination procedure returns a true result, the mode control unit may configure the USB type-C circuit as the RS232interface mode. Alternatively, the mode control unit may reset and may repeat the one or more mode determination procedures if the RS232 mode determination procedure returns a false result.

Preferably, before the mode control unit performs the ALT mode determination procedure, the mode control unit may perform a power delivery (PD) connection mode determination procedure. If the PD connection mode determination procedure returns a true result, the mode control unit may perform the ALT mode determination procedure. Otherwise, the mode control unit may perform the debug mode determination procedure if the PD connection mode determination procedure returns a false result.

Preferably, before the mode control unit performs the PD connection mode determination procedure, the mode control unit may perform a type-C connection determination procedure. If the type-C connection determination procedure returns true result, the mode control unit may perform the PD connection mode determination procedure. Otherwise the mode control unit may perform the RS232 mode determination procedure if the type-C connection determination procedure returns false result.

Preferably, the mode control unit may be connected to the USB type-C circuit and the USB non-type-C circuit. After the connection between both pins and the USB Type-C circuit or USB non-Type-C circuit is established, the first pin and the second pin may transmit signals to the USB type-C circuit or the USB non-type-C circuit. After the transmission of signals from both pins to the USB type-C circuit or the USB non-type-C circuit is halted, the mode control unit may be reset and may repeat the one or more mode determination procedures.

Henceforth, the combo chip which is applicable to an USB connector of the present disclosure may have one or more advantages as follows.

1. The combo chip may perform the mode determination procedure based on the input signal of the mode control unit in order to achieve sharing of chip pins between the mutually exclusive type-C and non-type-C USB circuits.

2. The combo chip may further perform one or more mode determination procedures, such that the USB type-C circuit is user-configurable for different application by utilizing one chip.

DESCRIPTION OF THE PREFERRED EMBODIMENTS

Figure 1:
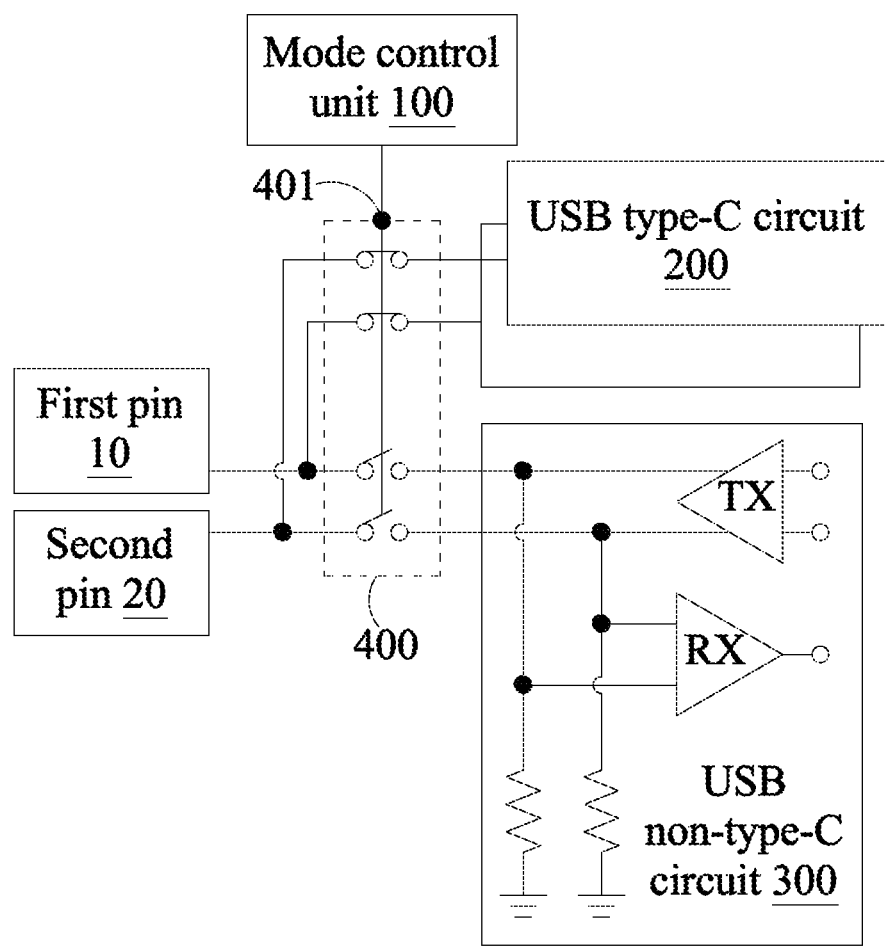
FIG. 1 is a schematic diagram of the first embodiment of a combo chip of the present disclosure.

Hereinafter, embodiments of the present disclosure will be described in detail with reference to the accompanying drawings so that those skilled in the art to which the present disclosure pertains can realize the present disclosure. As those skilled in the art would realize, the described embodiments may be modified in various different ways, all without departing from the spirit or scope of the present disclosure.

For better understanding, like elements are designated by like reference numerals in the accompanying drawings and the following description for the embodiments.

Please refer to FIG. 1 which is a schematic diagram of the first embodiment of a combo chip of the present disclosure. As shown in the figure, a combo chip includes an USB type-C circuit 200, an USB non-type-C circuit 300, a switch unit 400 connected to the USB type-C circuit 200 and the USB non-type-C circuit 300, and a mode control unit 100 connected to a control terminal 401 of the switch unit 400. After performing one or more mode determination procedures, the mode control unit 100 controls the switch unit 400 to connect the USB type-C circuit 200 to a first pin 10 and a second pin 20 while disconnecting the USB non-type-C circuit 300 from the first pin 10 and the second pin 20, or controls the switch unit 400 to connect the USB non-type-C circuit 300 to the first pin 10 and the second pin 20 while disconnecting the USB type-C circuit 200 from both pins 10, 20.

In the embodiment, the mode control unit 100 performs one or more mode determination procedures according to external signals, such that one of the USB type-C circuit 200 and the USB non-type-C circuit 300 is connected to the first pin 10 and the second pin 20 while the other is disconnected from the first pin 10 and the second pin 20. As the USB type-C circuit 200 and the USB non-type-C circuit 300 are mutually exclusive operational-wise, only one of the USB type-C circuit 200 and the USB non-type-C circuit 300 is required to be connected such that the chip will function properly. Here, the source of external signals fed into the mode control unit 100 may come from the cc pin of an USB type-C connector. When the USB type-C connector is connected to a corresponding connecting device, a handshaking protocol is executed between both devices to determine operating mode of both devices. During the handshaking protocol, the cc pin of the USB type-C connector will be fed with input signals which contain information such as voltage or current. The information enables the mode control unit 100 to determine the type of functions combo chip should provide so as to connect the chip pins to the corresponding circuit. However, the combo chip of the present disclosure is not limited thereto. If there are different pin configurations for the USB connector under different operating modes, the mode control unit 100 can treat the pin configurations of the USB connector as external signals for the mode determination procedure. In the embodiment, the dispensable circuit can be turned off by the combo chip and turned on when needed. So, arranging the dedicated chip pin for the USB type-C circuit 200 and the USB non-type-C circuit 300 is unnecessary. As shown in the figure, the USB type-C circuit 200 and the USB non-type-C circuit 300 can share the first pin 10 and the second pin 20 of the combo chip. Regarding the current design of the USB connector, the USB type-C circuit 200 and the USB non-type-C circuit 300 are disposed in different blocks of the chip and connected externally via different chip pins. However, the combo chip of the present disclosure is able to combine circuits having different functions, thereby reducing the amount of chip pins and the area which the circuit occupies. In addition, the length and number of wire bonding of the packaged chip can be reduced, such that the high-frequency efficiency is promoted.

In the embodiment, the switch unit 400 included multiple switch components, and the switch components may be single electronic circuit element such as metal oxide semiconductor field effect transistor (MOSFET). Here, the control terminal 401 is connected to the gate electrode of MOSFET, and the bias voltage of the mode control unit 100 is applied to change the conducting state between the source electrode and drain electrode of MOSFET. The conducting state in turn manipulates which one of the USB type-C circuit 200 and the USB non-type-C circuit 300 connects to the first 10 and second 20 pin. However, the combo chip of the present disclosure is not limited thereto. Other components or circuits with switch function are viable candidates to form the switch unit 400 of the present disclosure as well.

Figure 2:
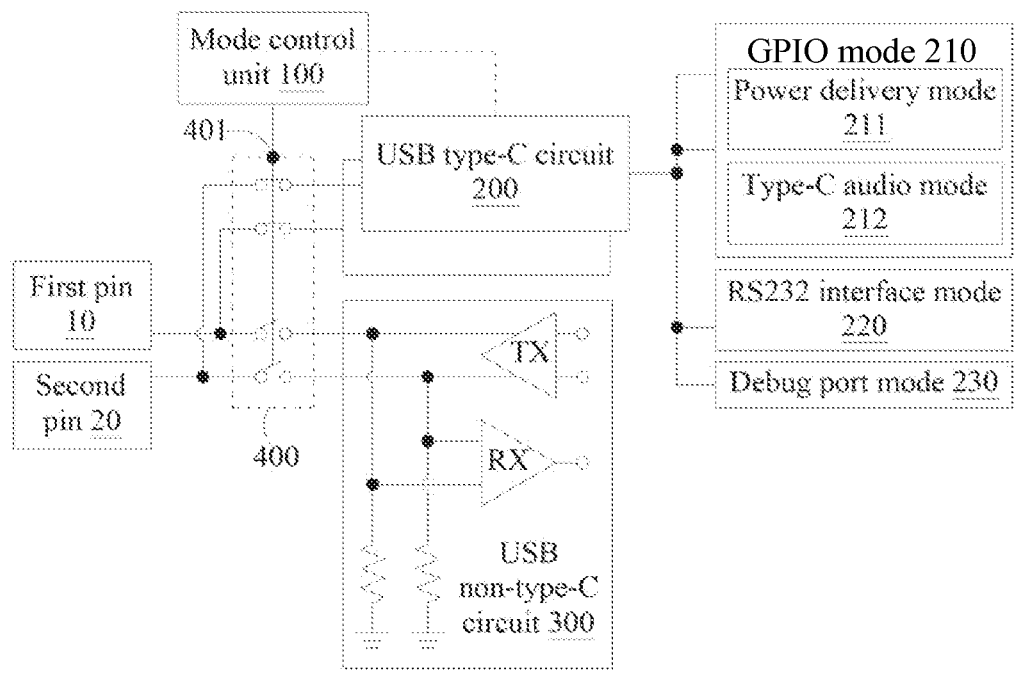
FIG. 2 is a schematic diagram of the second embodiment of a combo chip of the present disclosure.

Please refer to FIG. 2 which is a schematic diagram of the second embodiment of a combo chip of the present disclosure. As shown in the figure, the mode control unit 100 is connected to the USB type-C circuit 200. The one or more mode determination procedures include an alternative (ALT) mode determination procedure. If the ALT mode determination procedure returns a true result, the mode control unit 100 connects the first pin 10 and the second pin 20 to the USB type-C circuit 200 while configuring the USB type-C circuit 200 to a general purpose input/output (GPIO) mode 210. Alternatively, if the ALT mode determination procedure returns a false result, the mode control unit 100 connects the first pin 10 and the second pin 20 to the USB non-type-C circuit 300.

Specifically, the mode control unit 100 may further assign the function circuit needed by USB type-C circuit 200 after connecting the first pin 10 and the second pin 20 to the USB type-C circuit 200. In the embodiment, through the direct or indirect connection, the mode control unit 100 configures the USB type-C circuit 200 to the GPIO mode 210. Here, the GPIO mode 210 may be further divided into a power delivery (PD) mode 211 and a type-C audio mode 212. The USB type-C circuit 200 may switch between the two modes 211 and 212 according to the control signals from the mode control unit 100. Alternatively USB type-C circuit 200 may interpret input from switch unit 400 and switch accordingly. In the embodiment, the condition for the ALT mode determination is the same as that of the USB PD 2.0 and hence omitted.

Preferably, after the ALT mode determination procedure returns a true result and the mode control unit 100 connects the first pin 10 and the second pin 20 to the USB type-C circuit 200, the mode control unit 100 performs a GPIO mode determination procedure. If the GPIO mode determination procedure returns a true result, the mode control unit 100 configures the USB type-C circuit 200 to the GPIO mode 210. If the GIPO mode determination procedure otherwise returns a false result, the mode control unit 100 configures the USB type-C circuit 200 to a debug port mode 230.

In the embodiment, the function of the debug port mode 230 can be integrated into the USB type-C circuit 200. So, when the ALT mode determination procedure ends with true result, the mode control unit 100 proceeds to the GPIO mode determination procedure. In the case which the input signals are out of the GPIO mode preset range, the mode control unit 100 configures the USB type-C circuit 200 to the debug port mode 230, so that the combo Chip of the present disclosure is applicable in the development or inspection phase and therefore reduces the required circuit area.

Preferably, after the GPIO mode determination procedure returns a false result and before the mode control unit 100 configures the USB type-C circuit 200 to the debug port mode 230, the mode control unit 100 performs a debug mode determination procedure. If the debug mode determination procedure returns a true result, the mode control unit 100 configures the USB type-C circuit 200 to the debug port mode 230. Alternatively the mode control unit 100 configures the USB type-C circuit 200 to a RS232 interface mode 220 if the debug mode determination procedure returns a false result.

In the embodiment, the RS232 interface mode 220 can be integrated into the USB type-C circuit 200. So, when the GPIO mode determination procedure returns a false result, the mode control unit 100 proceeds to the debug mode determination procedure. If the input signals are not in the debug mode preset range, the mode control unit 100 configures the USB type-C circuit 200 to the RS232 interface mode 220. Under the specification of the USB Type-C, switching the interface of the USB Type-C to the other interfaces is allowed. Consequently, the function of the RS232 interface mode 220 can also be integrated into the USB type-C circuit 200, such that the combo chip of the present disclosure conforms to the connector with RS232 standard.

Preferably, after the debug mode determination procedure returns a false result and before the mode control unit 100 configures the USB type-C circuit 200 to the RS232 interface mode 220, the mode control unit 100 performs a RS232 interface mode determination procedure. If the RS232 mode determination procedure returns a true result, the mode control unit 100 configures the USB type-C circuit 200 to the RS232 interface mode 220. If the RS232 mode determination procedure returns a false result, the mode control unit 100 resets and re-performs the one or more mode determination procedures.

If the external signals fed to the made control unit 100 do not belong to any of the aforementioned normal operational states, an erroneous connection has probably occurred in the front end USB connector or in the peer device thereof. After examining the connection setting or the settings, the user may reconnect the USB connector, and the mode control unit 100 may receive the external signals again. In simple words, if the mode control unit 100 is incapable of determining the operating mode of the combo chip according to the external signals, the mode control unit 100 is set to repeat the one or more mode determination procedures till the connection and the operating mode of the USB type-C circuit 200 or that of the USB non-type-C circuit 300 can be determined correctly.

Preferably, before the mode control unit 100 performs the ALT mode determination procedure, the mode control unit 100 performs a power delivery (PD) connection mode determination procedure. If the PD connection mode determination procedure returns a true result, the mode control unit 100 proceeds to the ALT mode determination procedure. If the PD connection mode determination procedure returns a false result, the mode control unit 100 performs the debug mode determination procedure.

In the embodiment, the mode control unit 100 performs the PD connection mode determination procedure in advance in order to simplify the entire mode determination procedure. That is to say, if the mode control unit 100 has determined that the combo chip will not provide the USB PD function, the combo chip will definitely not provide the USB non-type-C mode or the GPIO mode 210. As a result, the mode control unit 100 may examine directly whether the combo chip is to be served as the debug port mode 230 or the RS232 interface mode 220, skipping the ALT mode determination procedure and the subsequent procedures.

Preferably, before the mode control unit 100 performs the PD connection mode determination procedure, the mode control unit 100 performs a type-C connection determination procedure. If the type-C connection determination procedure returns a true result, the mode control unit 100 proceeds to the PD connection mode determination procedure. If the type-C connection determination procedure returns a false result, the mode control unit 100 as a result proceeds to the RS232 mode determination procedure.

Figure 3:
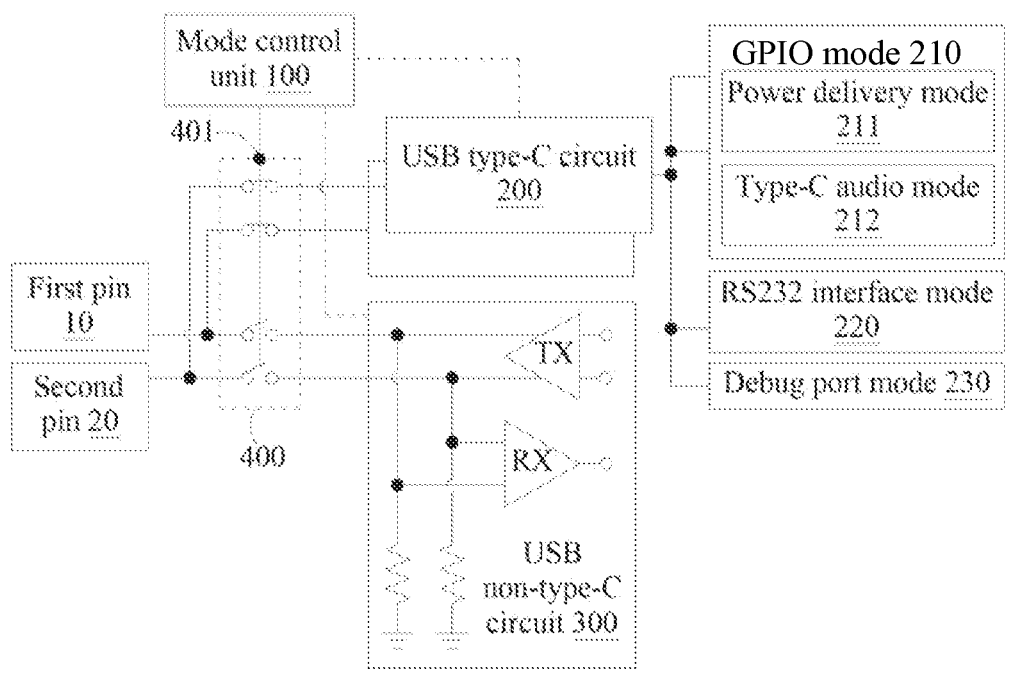
FIG. 3 is a schematic diagram of the third embodiment of a combo chip of the present disclosure.

As mentioned above, for the simplification of the mode determination procedure, mode control unit 100 can perform a type-C connection mode determination procedure before performing the PD connection mode determination procedure If the mode control unit 100 determines that the combo chip will not provide the USB type-C function, the combo chip will definitely not provide the functions of USB non-type-C mode, the GPO mode 210 or the debug port mode 230. As a result, the mode control mode 100 may examine directly whether the combo chip is to be served as the RS232 interface mode 220, skipping the rest of the mode determination procedures Please refer to FIG. 3 which is a schematic diagram of the third embodiment of a combo Chip of the present disclosure. As shown in the figure, the mode control unit 100 is connected to the USB-C circuit 200 and the USB non-type-C circuit 300. The first pin 10 and the second pin 20 feed signals into either the USB type-C circuit 200 or the USB non-type-C circuit 300 after connection between the two is established. If the transmission of signals from the first pin 10 and the second pin 20 to the USB type-C circuit 200 or the USB non-type-C circuit 300 is halted, the mode control unit 100 resets and repeats the one or more mode determination procedures.

When the combo chip is operating properly in one operating mode, one of the USB type-C circuit 200 and the USB non-type-C circuit 300 receives the signals from the first pin 10 and the second pin 20. Here, the determination procedure executed by the mode control unit 100 is paused to save resource. If the transmission of signals from the first pin 10 and the second pin 20 to the USB type-C circuit 200 or the USB non-type-C circuit 300 is halted, it is determined that the front end USB has been removed, or the previous normal operating mode of the combo chip has been stopped. As a result, one of the USB type-C circuit 200 and the USB non-type-C circuit 300 wakes up the mode control unit 100 through the direct or indirect connection with the mode control unit 100, such that the mode control unit 100 resets and repeats the one or more determination procedure and then determines the operating mode of the combo chip according to the next connection state of the front end connector.

In addition, the combo chip of the present disclosure is capable of the dynamic switching as well. For example, the resetting of the determination procedure of the mode control unit 100 may be triggered by the signal transmitted from the software of the peer device without removing the front end USB connector. When the device connected to the combo chip of the present disclosure is playing a video application program, the mode control mode 100 controls the USB type-C circuit 200 to connect to the first pin 10 and the second pin 20 and configures the circuit to the type-C audio mode 212. Afterwards, if it has to be switched into the charging function, the mode control unit 100 configures the USB type-C circuit 200 to the PD mode 211.

Figure 4:
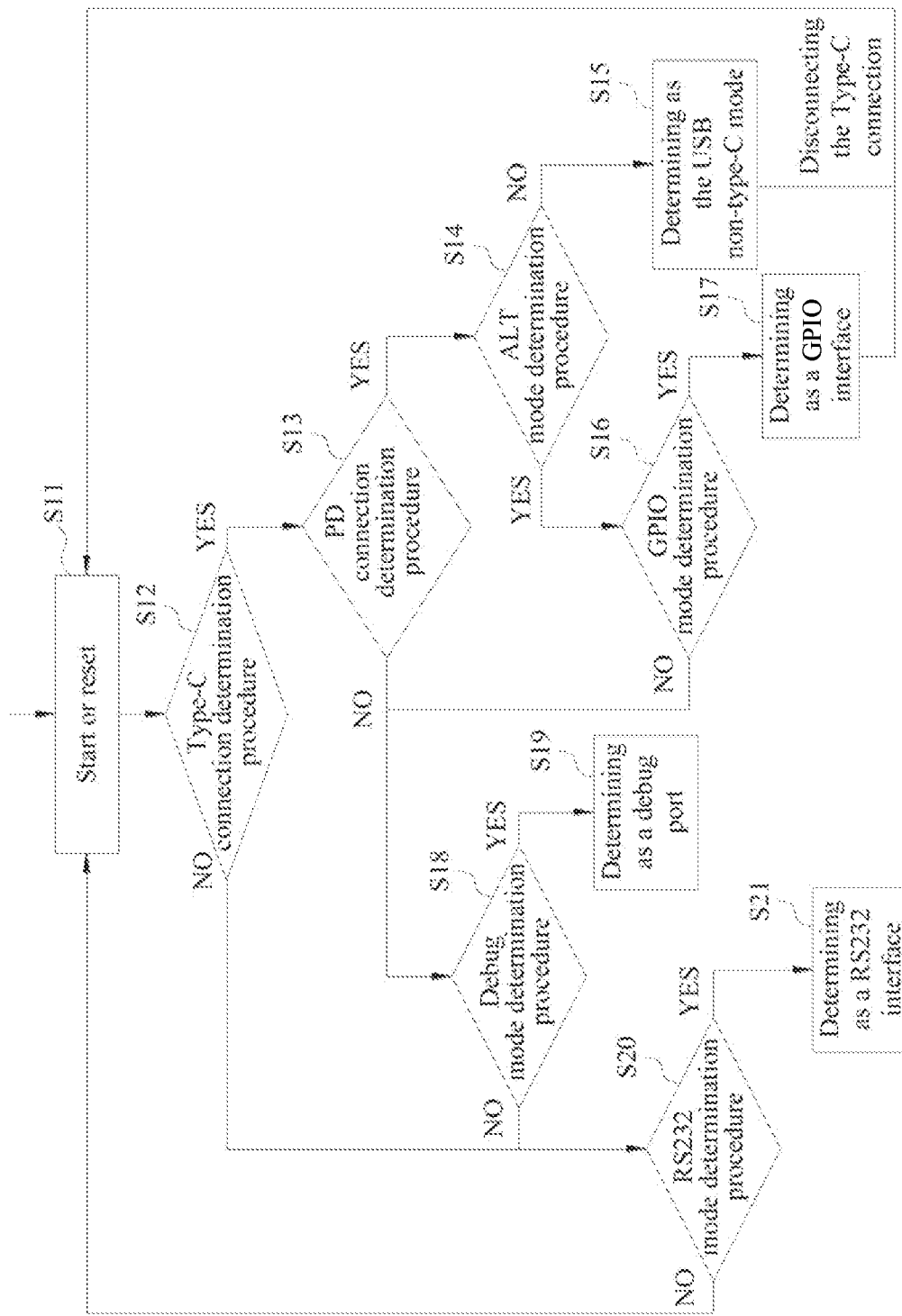
FIG. 4 is a flow chart of a mode determination procedure of a combo chip of the present disclosure.

Please refer to FIG. 4 which is a flow chart of a mode determination procedure of a combo Chip of the present disclosure. The following paragraph will explain the complicated mode determination procedure of the combo chip of the present disclosure represented by FIG. 4.

Step S11: the combo chip is energized and reset while the front end connector is connected, and the mode control unit 100 starts the mode determination procedures. Note that the mode determination results can only be true or false.

Step S12: the mode control unit 100 performs the type-C connection determination procedure. If the true result is returned, then step S13 is performed, otherwise, the step S20 is performed.

Step S13: the mode control unit 100 performs the PD connection determination procedure. If a true result is returned, then step S14 is performed, otherwise, the step S18 is performed.

Step S14: the mode control unit 100 performs the ALT mode determination procedure. If a true result is returned, then step S16 is performed, otherwise, the step S15 is performed.

Step S15: the mode control unit 100 determines that the combo chip should provide the USB non-type-C function, and then controls the USB non-type-C circuit 300 to connect to the first pin 10 and the second pin 20 while disconnecting the USB type-C circuit 200 from the first pin 10 and the second pin 20.

Step S16: the mode control unit 100 performs the GPIO mode determination procedure. If a true result is returned, then step S17 is performed, otherwise, the step S18 is performed.

Step S17: the mode control unit 100 determines that the combo chip should provide the GPIO function, and then controls the USB t e-C circuit 200 to connect to the first pin 10 and the second pin 20 while disconnecting the USB non-type-C circuit 300 from the first pin 10 and the second pin 20. In addition, the USB type-C circuit 200 is configured to the GPIO mode 210.

Step S18: the mode control unit 100 performs the debug mode determination procedure. If a true result is returned, then step 19 is performed, otherwise, the step S20 is performed.

Step S19: the mode control unit 100 determines that the combo chip should provide the debug port function, and then controls the USB type-C circuit 200 to connect to the first pin 10 and the second pin 20 while disconnecting the USB non-type-C circuit 300 from the first pin 10 and the second pin 20. In addition, the USB type-C circuit 200 is configured to the debug port mode 230.

Step S20: the mode control unit 100 performs the RS232 mode determination procedure. If a true result is returned, then step S21 is performed, otherwise, determination procedure is restarted and the mode control unit 100 a returns to step S11.

Step S21: the mode control unit 100 determines the combo chip should provide the RS232 interface function, and then controls the USB type-C circuit 200 to connect to the first pin 10 and the second pin 20 while disconnecting the USB non-type-C circuit 300 from the first pin 10 and the second pin 20. In addition, the USB type-C circuit 200 is configured to the RS232 interface mode 220. If the type-C signal is terminated while the combo chip is in the USB non-type-C or GPIO mode 210, then step S11 is performed. In other words, the mode control unit 100 resets and then restarts the mode determination procedures.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A combo chip applicable to an universal serial bus (USB) connector, comprising:
   an USB type-C circuit;
   an USB non-type-C circuit;
   a switch unit connected to the USB type-C circuit and the USB non-type-C circuit; and
   a mode control unit connected to a control terminal of the switch unit, and after performing one or more mode determination procedures, the mode control unit controls the switch unit to connect the USB type-C circuit to a first pin and a second pin while disconnecting the USB non-type-C circuit from the first pin and the second pin, or otherwise controls the switch unit to connect the USB non-type-C circuit to the first pin and the second pin while disconnecting the USB type-C circuit from the first pin and the second pin;
   wherein the mode control unit is connected to the USB type-C circuit, and the one or more mode determination procedures comprise an alternative (ALT) mode determination procedure; if the ALT mode determination procedure returns a true result, then the mode control unit controls the first pin and the second pin to connect to the USB type-C circuit while configuring the USB type-C circuit to a general purpose input/output (GPIO) mode, otherwise the mode control unit controls the first pin and the second pin to connect to the USB non-type-C circuit if the ALT mode determination procedure returns a false result;
   wherein after the ALT mode determination procedure returns the true result and the mode control unit controls the first pin and the second pin to connect to the USB type-C circuit, the mode control unit performs a GPIO mode determination procedure, if the GPIO mode determination procedure returns a true result, then the mode control unit configures the USB type-C circuit to the GPIO mode, otherwise the mode control unit configures the USB type-C circuit to a debug port mode if the GPIO mode determination procedure returns a false result;

wherein during an time interval between the GPIO mode determination procedure returns the false result and the mode control unit configures the USB type-C circuit as the debug port mode, the mode control unit performs a debug mode determination procedure, and if the debug mode determination procedure returns a true result, then the mode control unit configures the USB type-C circuit as the debug port mode, otherwise the mode control unit configures the USB type-C circuit to a RS232 interface mode if the debug mode determination procedure returns a false result.

2. The combo chip of claim 1, wherein during an time interval between the debug mode determination procedure returns the false result and the mode control unit configures the USB type-C circuit to the RS232 interface mode, the mode control unit performs a RS232 interface mode determination procedure, if the RS232mode determination procedure returns a true result, then the mode control unit configures the USB type-C circuit as the RS232 interface mode, otherwise the mode control unit resets and repeats the one or more mode determination procedures if the RS232 mode determination procedure returns a false result.

3. The combo chip of claim 2, wherein before the mode control unit performs the ALT mode determination procedure, the mode control unit firstly performs a power delivery (PD) connection mode determination procedure, if the PD connection mode determination procedure returns a true result, then the mode control unit performs the ALT mode determination procedure, otherwise the mode control unit performs the debug mode determination procedure if the PD connection mode determination procedure returns a false result.

4. The combo chip of claim 3, wherein before the mode control unit performs the PD connection mode determination procedure, the mode control unit firstly performs a type-C connection determination procedure, if the type-C connection determination procedure returns a true result, then the mode control unit performs the PD connection mode determination procedure, otherwise the mode control unit performs the RS232 mode determination procedure if the type-C connection determination procedure returns a false result.

5. The combo chip of claim 1, wherein the mode control unit is connected to the USB type-C circuit and the USB non-type-C circuit, and after the first pin and the second pin are connected to the USB type-C circuit or the USB non-type-C circuit, the first pin and the second pin transmit signals to the USB type-C circuit or the USB non-type-C circuit, and wherein after the first pin and the second pin stop transmitting signals to the USB type-C circuit or the USB non-type-C circuit, the mode control unit is configured to be reset and then to repeat the one or more mode determination procedures.

* * * * *